May 26, 1931.  A. J. GINSBERG  1,807,476
RECEPTACLE
Filed Aug. 10, 1929
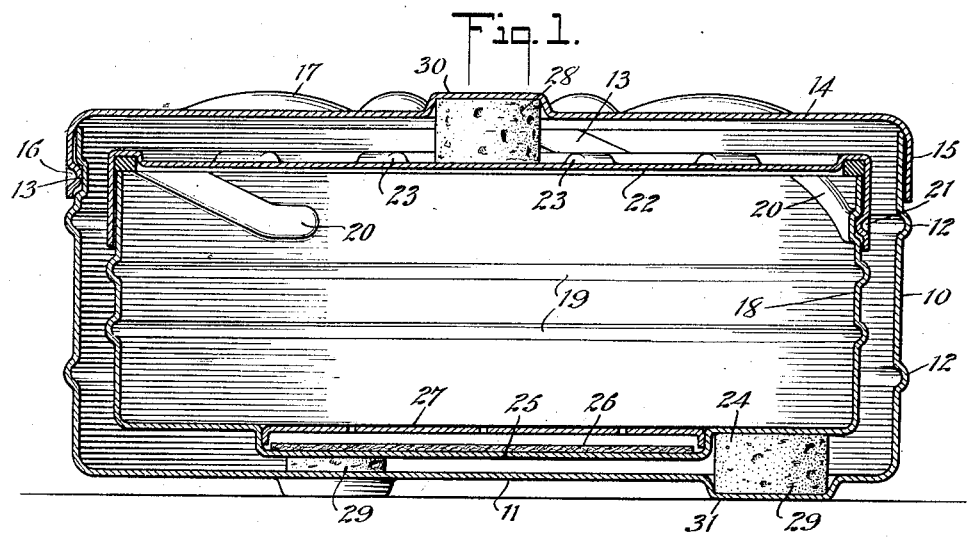
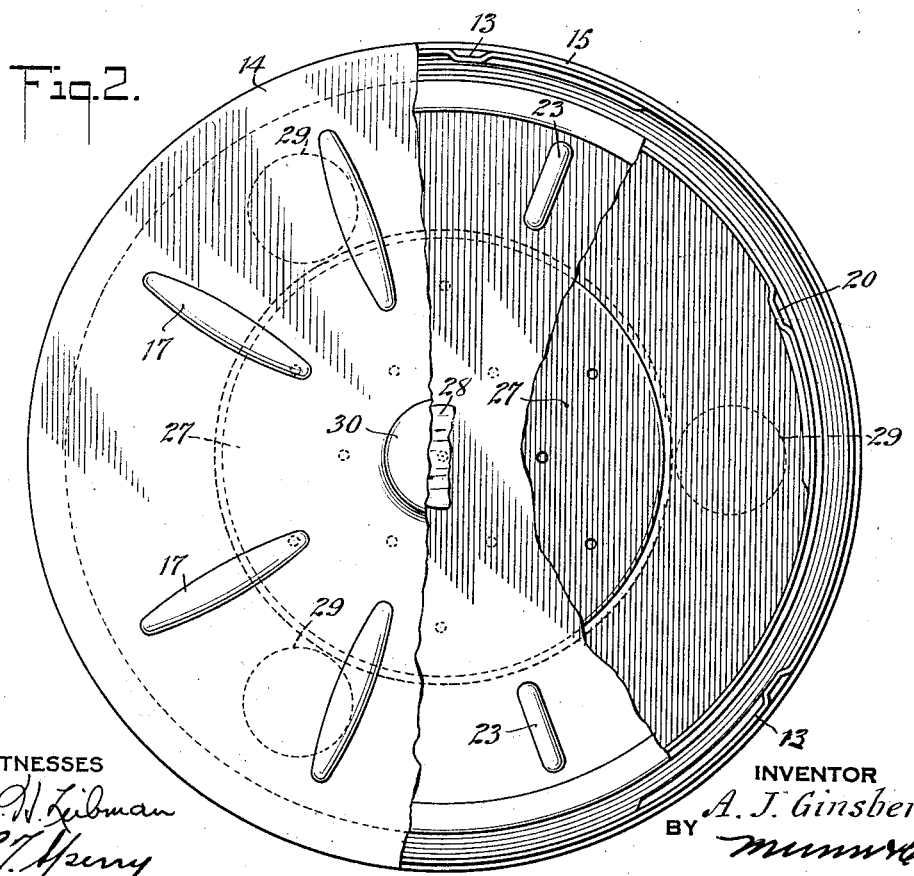
WITNESSES
INVENTOR
A. J. Ginsberg
BY
ATTORNEY Patented May 26, 1931

1,807,476

UNITED STATES PATENT OFFICE

ABRAHAM J. GINSBERG, OF NEW YORK, N. Y.

RECEPTACLE

Application filed August 10, 1929. Serial No. 385,003.

This invention relates to receptacles.

It is among the objects of the present invention to provide a novel and improved heat insulated receptacle which is simple in construction and which may be readily designed to meet the demands of economic manufacture.

A further object of the present invention is to provide an improved heat insulated receptable especially adapted for use in storing or conveying motion picture films or the like.

A further object of the present invention is to provide a novel and improved receptacle which includes an inner and an outer body, together with novel spacing means therefor.

A further object of the present invention is to provide spacing means for an inner receptacle which by association with the top and bottom of the outer receptacle, prevents side movement of the inner receptacle.

A further object of the present invention is to provide a fire-proof film receptacle which by the provision of a dead-air space between the inner and outer walls of the receptacle, prevents the heating of the inner receptacle and thus prevents fire from affecting the contents.

Other objects of the present invention include the combination and interrelation of parts, whereby the whole forms an improved structure which is simple in manufacture and operation.

Other objects of the present invention will be apparent from a consideration of the following specification taken in conjunction with the accompanying drawings, in which Figure 1 is a sectional view of one preferred embodiment of the present invention, and Fig. 2 is a top plan view partly broken away of that form of the device shown in Fig. 1.

Referring more particularly to the drawings, the invention includes an outer receptacle having a side wall 10 and a bottom 11. The side wall 10 is provided with annular reinforcing ribs 12, and the open upper edge of the wall is provided with a plurality of bayonet depressions 13, which will be seen to co-operate with a cover to provide a bayonet type closure joint therebetween. The cover for the outer receptacle is indicated by the numeral 14 and includes a depending lip 15 which is provided with depressions 16 which engage in the depressions 13 whereby rotary movement of the cover with respect to the body will lock the same. For readily rotating the cover with respect to the body for locking or unlocking the same, the cover is provided with an artistically arranged group of radially extending pressed portions 17 which are adapted to be moved by the fingers to rotate the cover.

Within the outer receptacle there is provided a similar smaller receptacle having a side wall 18 which is reinforced by the annular ribs 19. The upper edge of the side wall 18 is also provided with bayonet depressions 20 which co-operate with locking projections 21 of a cover 22. The cover 22 of the inner receptacle is also provided with finger-engaging projections 23 which act to assist in rotating the inner cover with respect to its receptacle.

For providing the proper humidity within the inner receptacle, the bottom 24 thereof is depressed as at 25, to provide a depressed space which receives an absorbent pad 26 which may be moistened to provide moisture within the inner receptacle. The depressed space is preferably covered by a suitable apertured cover plate 27 which frictionally engages the inner face of the depending side walls of the depression 25.

For maintaining the inner receptacle in suitably insulated spaced relation to the outer receptacle, there is provided an upper spacing member 28 and a plurality of bottom spacing members 29. The spacing members 28 and 29 are preferably formed of cork or other heat insulating material. The upper member 28 is secured by gluing or the like within a central depression 30 in the top 14 of the outer receptacle. The inner end of the member 28 bears against the central portion of the inner cover 22, thus assisting in holding the inner receptacle in proper spaced relation to the outer receptacle. The lower spacing members 29 are received within depressions 31 of the bottom 11 of the outer receptacle to which they are secured by gluing or the like. There are preferably three of the spacing members 29 and they are arranged to removably receive thereon the inner receptacle and to engage the bottom thereof adjacent the outer face of the side walls of the depression 25, whereby sliding movement of the inner receptacle with respect to the outer receptacle is prevented by the engagement of the sides of the depression 25 with the sides of the spacing members 29.

From the foregoing it will readily be seen that the device provides for a dead air space between the outer and inner receptacles and that it provides for the spacing of the inner receptacle from the outer receptacle by heat insulating members and prevents relative movement between the receptacles without requiring the use of conducting connectors between the sides of the inner and outer receptacles. Thus the inner receptacle is maintained in spaced relation by a minimum of conducting medium. By the use of cork or similar material, which is non-conductive of heat, the device provides for maintaining the inner receptacle at a desired predetermined temperature. It will be seen that the invention provides a novel, simple and improved construction for the storing and conveyance of photographic films and further provides for maintaining the film chamber at a desired temperature and humidity. It will be understood that the invention is not confined to the specific structural details herein presented but that numerous changes, modifications and the full use of equivalents may be resorted to without departing from the spirit or scope of the invention as outlined in the appended claims.

What is claimed is:

1. In a device of the character described, an outer receptacle, a removable inner receptacle, said inner receptacle including an offset portion defining a depression and an absorbent material carried within said depression within said inner receptacle, and spacing means carried by said outer receptacle co-operating with said offset portion to maintain the inner receptacle centered within the outer receptacle.

2. A device of the character set forth having the combination of an outer and inner receptacle each provided with a removable cover, the bottom of the inner receptacle having a concentric offset portion defining a depression containing an absorbent material, the bottom of the outer receptacle having an annular series of outwardly depressed portions which, when the inner receptacle is placed within the outer receptacle, are tangential to the periphery of the offset portion, the cover of the outer receptacle having an outwardly depressed portion adapted to engage a spacing member, and spacing means carried by said outer receptacle cooperating with said offset portions to maintain the inner receptacle centered within the outer receptacle.

ABRAHAM J. GINSBERG.